United States Patent
Collmer et al.

(10) Patent No.: US 11,345,214 B2
(45) Date of Patent: May 31, 2022

(54) VEHICLE HEATER

(71) Applicant: Eberspächer Climate Control Systems GmbH & Co. KG, Esslingen (DE)

(72) Inventors: Andreas Collmer, Aichwald (DE); Uwe Grotstollen, Esslingen (DE); Michael Haefner, Stuttgart (DE); Thorsten Findeis, Albershausen (DE)

(73) Assignee: EBERSPÄCHER CLIMATE CONTROL SYSTEMS GMBH, Esslingen Am Neckar (DE)

( * ) Notice: Subject to any disclaimer, the term of this patent is extended or adjusted under 35 U.S.C. 154(b) by 193 days.

(21) Appl. No.: 16/542,925

(22) Filed: Aug. 16, 2019

(65) Prior Publication Data

US 2020/0055374 A1 Feb. 20, 2020

(30) Foreign Application Priority Data

Aug. 17, 2018 (DE) ...................... 10 2018 120 030.7

(51) Int. Cl.
*B60H 1/22* (2006.01)

(52) U.S. Cl.
CPC ... *B60H 1/2206* (2013.01); *B60H 2001/2271* (2013.01); *B60H 2001/2278* (2013.01);
(Continued)

(58) Field of Classification Search
CPC .............. B60H 1/2206; B60H 1/2122; B60H 2001/2278; B60H 2001/2171;
(Continued)

(56) References Cited

U.S. PATENT DOCUMENTS 2,726,042 A * 12/1955 Baier ...................... B60H 1/032
237/12.3 C
3,094,979 A * 6/1963 Volbehr ............... B60H 1/2203
126/110 R
(Continued)

FOREIGN PATENT DOCUMENTS

CN 104566360 A 4/2015
DE 2432850 A1 * 1/1976 ............... B60H 1/22
(Continued)

OTHER PUBLICATIONS

"DE_10303688_B3_M—Machine Translation.pdf", machine translation, EPO.org., Apr. 24, 2021. (Year: 2021).*
(Continued)

*Primary Examiner* — Steven B McAllister
*Assistant Examiner* — Daniel E. Namay
(74) *Attorney, Agent, or Firm* — McGlew and Tuttle, P.C.

(57) ABSTRACT

A vehicle heater includes a heater housing (12) elongated in a direction of a housing longitudinal axis (L). A housing circumferential wall (34) defines a combustion air flow space (40). A combustion chamber assembly unit (14) is carried on the heater housing and has a combustion chamber (20) receiving combustion air from the combustion air flow space. A combustion air blower (42), with a combustion air blower housing (44), is carried on the heater housing. A combustion air inlet opening (56), in the combustion air blower housing, provides the inlet for combustion air into the combustion air blower. A combustion air connection unit (64), carried on the heater housing, has a combustion air passage duct (74) open outwardly in a first duct opening area (76) for receiving combustion air. The combustion air passage duct is open towards the combustion air inlet opening in a second duct opening area (78).

13 Claims, 4 Drawing Sheets

(52) U.S. Cl.
CPC ............... *B60H 2001/2281* (2013.01); *B60H 2001/2284* (2013.01)

(58) Field of Classification Search
CPC .... B60H 2001/2281; B60H 2001/2284; F23D 2202/00; F23D 2900/21002; F23D 2900/14001; F24H 3/065; F24H 3/087; F24H 3/105; F24H 9/02
USPC .................................................. 237/12.3 C
See application file for complete search history.

(56) References Cited

U.S. PATENT DOCUMENTS

| | | | | |
|---|---|---|---|---|
| 3,159,201 | A * | 12/1964 | Hottenroth | B60H 1/2203 431/259 |
| 4,519,375 | A * | 5/1985 | Galtz | B60H 1/2212 126/110 B |
| 4,530,658 | A * | 7/1985 | Panick | F24H 3/065 126/116 R |
| 4,623,310 | A * | 11/1986 | Kimijima | F23D 5/00 126/110 B |
| 4,923,033 | A * | 5/1990 | Panick | B60H 1/2212 126/116 R |
| 5,456,408 | A * | 10/1995 | Appel | B60H 1/2206 237/12.3 C |
| 5,727,730 | A * | 3/1998 | Habijanec | B60H 1/2212 126/110 A |
| 5,738,506 | A * | 4/1998 | Mosig | B60H 1/2203 237/12.3 C |
| 6,540,150 | B1 * | 4/2003 | Eberspach | F24H 9/2085 126/110 B |
| 6,726,114 | B2 * | 4/2004 | Blaschke | B01B 1/005 237/2 R |
| 6,743,012 | B2 * | 6/2004 | Wolf | B60H 1/2212 165/41 |
| 10,684,008 | B2 * | 6/2020 | Kido | F23Q 7/08 |
| 2002/0117551 | A1 * | 8/2002 | Wolf | B60H 1/2212 237/12.3 C |
| 2008/0017359 | A1 * | 1/2008 | Ludwig | F28F 1/02 165/138 |
| 2008/0128525 | A1 * | 6/2008 | Ludwig | B60H 1/2212 237/12.3 A |
| 2008/0201948 | A1 * | 8/2008 | Ludwig | F28F 1/02 29/890.03 |
| 2017/0267064 | A1 * | 9/2017 | Brandt | F23N 1/002 |

FOREIGN PATENT DOCUMENTS

| | | | | |
|---|---|---|---|---|
| DE | 32 29 365 | A1 | 4/1983 | |
| DE | 3310501 | A1 | 10/1984 | |
| DE | 3509346 | A1 * | 9/1986 | ........... F24H 9/0057 |
| DE | 3509349 | A1 * | 9/1986 | ................ F28F 1/42 |
| DE | 4311080 | C1 * | 3/1994 | ........... B60H 1/2206 |
| DE | 10058794 | A1 * | 6/2002 | ............. F24H 9/146 |
| DE | 10136292 | A1 * | 2/2003 | ............... F23D 3/40 |
| DE | 103 03 688 | B3 | 8/2004 | |
| DE | 10 2005 032 03 | A1 | 1/2007 | |
| DE | 102013002046 | B3 * | 2/2014 | ............... F23D 3/40 |
| EP | 1 927 488 | A2 | 6/2008 | |
| EP | 1927488 | A2 * | 6/2008 | ........... F24H 3/0488 |
| EP | 3346219 | A1 | 7/2018 | |
| EP | 3480519 | A1 * | 5/2019 | ............. F24H 1/009 |
| FR | 1571918 | A * | 6/1969 | ............. F02N 19/10 |
| GB | 1198869 | A * | 7/1970 | ........... B60H 1/2212 |
| JP | 53069336 | A * | 6/1978 | ........... B60H 1/2203 |
| JP | 59170645 | A | 9/1984 | |
| RU | 162165 | U1 | 5/2016 | |
| WO | WO-2016195046 | A1 * | 12/2016 | ............... F23D 3/40 |

OTHER PUBLICATIONS

"EP_1927488_A2_M—MachineTranslation.pdf", machine translation, EPO.org., Apr. 24, 2021. (Year: 2021).*
"EP_3346219_A1_M—MachineTranslation.pdf", machine translation, EPO.org., Apr. 24, 2021. (Year: 2021).*
"DE_3229365_A1_M—Machine Translation.pdf", machine translation, EPO.org, Oct. 14, 2021. (Year: 2021).*
"DE_3310501_A1_M—Machine Translation.pdf", machine translation, EPO.org, Oct. 14, 2021. (Year: 2021).*
"DE_3509346_A_M—Machine Translation.pdf", machine translation, EPO.org, Aug. 12, 2020. (Year: 2020).*
"DE_102013002046_B3_M—Machine Translation.pdf", machine translation, EPO.org, Aug. 13, 2020. (Year: 2020).*

* cited by examiner

VEHICLE HEATER

CROSS REFERENCE TO RELATED APPLICATIONS

This application claims the benefit of priority under 35 U.S.C. § 119 of German Application 10 2018 120 030.7, filed Aug. 17, 2018, the entire contents of which are incorporated herein by reference.

TECHNICAL FIELD

The invention pertains to a vehicle heater which can be operated as a parking heater or as an auxiliary heater. Such a vehicle heater generally comprises a heater housing that is elongated in a direction of a housing longitudinal axis with a housing circumferential wall defining a combustion air flow space in the radially outward direction, a combustion chamber assembly unit carried on the heater housing with a combustion chamber receiving combustion air from the combustion air flow space, as well as a combustion air blower that is configured as, for example, a side channel blower with a combustion air blower housing carried on the heater housing.

TECHNICAL BACKGROUND

It is, in principle, required in case of such vehicle heaters that the lines and pipes or openings which are used for feeding and for discharging different media, such as combustion air, liquid fuel and the waste gas generated during combustion in the combustion chamber be positioned at the heater such that these lines, pipes, openings correspond to a uniform connection pattern generally provided in vehicles, so that heaters of different designs can be integrated into different vehicles in a simple manner. Since such heaters have different sizes as a function of the required or desired heat output, it is especially difficult in case of heaters having a larger configuration to generate this heat output in respect to the connections to be provided thereon such that an agreement can be established with the simplified connection pattern.

SUMMARY

An object of the present invention is to produce a vehicle heater such that it can be adapted and be connected to a connection area provided in a vehicle with a defined connection pattern in a simple manner.

This object is accomplished according to the present invention by a vehicle heater, comprising:
- a heater housing, which is elongated in the direction of a housing longitudinal axis, with a housing circumferential wall defining a combustion air flow space in the radially outward direction,
- a combustion chamber assembly unit, which is carried on the heater housing, with a combustion chamber receiving combustion air from the combustion air flow space,
- a combustion air blower with a combustion air blower housing carried on the heater housing, wherein a combustion air inlet opening is provided in the combustion air blower housing for the inlet of combustion air into the combustion air blower, and
- a combustion air connection unit, which is carried on the heater housing, with a combustion air passage duct, wherein the combustion air passage duct is open in the outward direction in a first duct opening area for receiving combustion air and the combustion air passage duct is open towards the combustion air inlet opening in a second duct opening area.

The area with which this vehicle heater is connected to a connection area provided in a vehicle may have a flexible design in case of a vehicle heater configured according to the present invention. The uncoupling of the combustion air passage duct, which leads to the combustion air blower, from the combustion air blower itself and the provision of this duct at the combustion air connection unit make it possible to configure this combustion air connection unit as an interface between the heater or the combustion air blower and the connection area of the vehicle. This in turn makes it possible to provide combustion air connection units having different designs for different heaters in order to be able to connect these heaters in a simple manner to connection areas provided in vehicles with a connection pattern, which is, in principle, simplified. The different system areas of the heater, especially the combustion air blower, may be configured and dimensioned in this manner regardless of the connection pattern predefined by the connection area in a vehicle in order to be able to still establish the necessary connection at the connection area provided in the vehicle via the combustion air connection unit to be provided according to the present invention.

Provisions may be made, for example, for an increased freedom in the structural configuration of the combustion air blower for the combustion air inlet opening to have an opening central axis that has an essentially radial orientation, for a first duct section of the combustion air passage duct, which provides the first duct opening area, to have a duct central axis that has an essentially radial orientation, and for the duct central axis to be offset in the direction of the housing longitudinal axis, for example, towards the combustion chamber assembly unit, in relation to the opening central axis. Of course, such an axial offset may be accompanied by an offset in the circumferential direction as well.

The combustion air connection unit may have a plate-shaped connection unit body, which is made, for example, of plastic material for embodying a simple configuration, the connection unit body being positioned with a first body side located opposite an outer side of the housing circumferential wall and opposite an outer side of the combustion air blower housing.

The combustion air passage duct may be open with its second duct opening area towards the combustion air inlet opening on the first body side of the connection unit body, and a combustion air inlet pipe, which at least partially provides the first duct section, may protrude on a second body side of the connection unit body, which second body side faces away from the first body side.

To create the offset mentioned above, a second duct section, which leads from the first duct section to the second duct opening area and provides the second duct opening area, may be provided in the connection unit body, wherein the second duct section has a duct central axis that is bent at an angle to the duct central axis of the first duct section.

A sealing element, which seals the combustion air blower housing in a gastight manner in relation to the heater housing, seals the combustion air blower housing in a gastight manner in relation to the combustion air connection unit and seals the heater housing in a gastight manner in relation to the combustion air connection unit, may be provided in order to prevent the discharge of gas, especially also waste gas, from the heater. The use of a single sealing element also avoids areas of different sealing elements adjoining one another, which may lead to leaks.

Provisions may be made, for example, for the sealing element to be positioned with a first sealing element area between a front side of the housing circumferential wall and a front side of the combustion air blower housing, which front side is located opposite this front side of the housing circumferential wall, to be positioned with a second sealing element area extending along an edge area of the combustion air inlet opening between the combustion air blower housing and the combustion air connection unit and to be positioned with a third sealing element area meshing with a fuel line passage recess, which is formed in the housing circumferential wall, is open in the direction of the front side of the housing circumferential wall, and through which a fuel line passes.

The combustion air connection unit may have a fuel line passage opening, through which a fuel line may extend, for supplying the vehicle heater with fuel.

To also establish a tight connection in this area, the sealing element may be positioned with its third sealing element area between the housing circumferential wall and the combustion air connection unit extending along an edge area of the fuel line passage recess and the fuel line passage opening.

The combustion air connection unit may, furthermore, have a waste gas outlet passage opening, and a waste gas outlet pipe which is provided on the heater housing may extend through the waste gas outlet passage opening.

For stable integration of a vehicle heater configured according to the present invention in a vehicle, it is proposed that a mounting formation be provided at the combustion air connection unit for the fixed mounting of the vehicle heater on a heater carrier. The mounting formation may comprise, for example, a plurality of mounting pins, which are configured as studs or set screws.

The heater housing may be accommodated in an outer housing especially when the vehicle heater is configured as an air heater, so that an air flow passing through the outer housing and flowing about the heater housing may absorb heat in a heat exchanger area of the heater. A connection unit opening accommodating the combustion air connection unit is preferably provided in the outer housing.

In order to guarantee a gastight connection in the area of the connection unit opening, it is proposed that a connection unit sealing element be provided, which seals the combustion air connection unit in a gastight manner in relation to the outer housing.

In this connection, the connection unit sealing element may especially be designed such that it has a passage opening, through which the connection unit sealing element passes and which provides a gastight sealing in relation to same in association with the combustion air inlet pipe, with the fuel line, with the waste gas outlet pipe and with each mounting pin, respectively.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
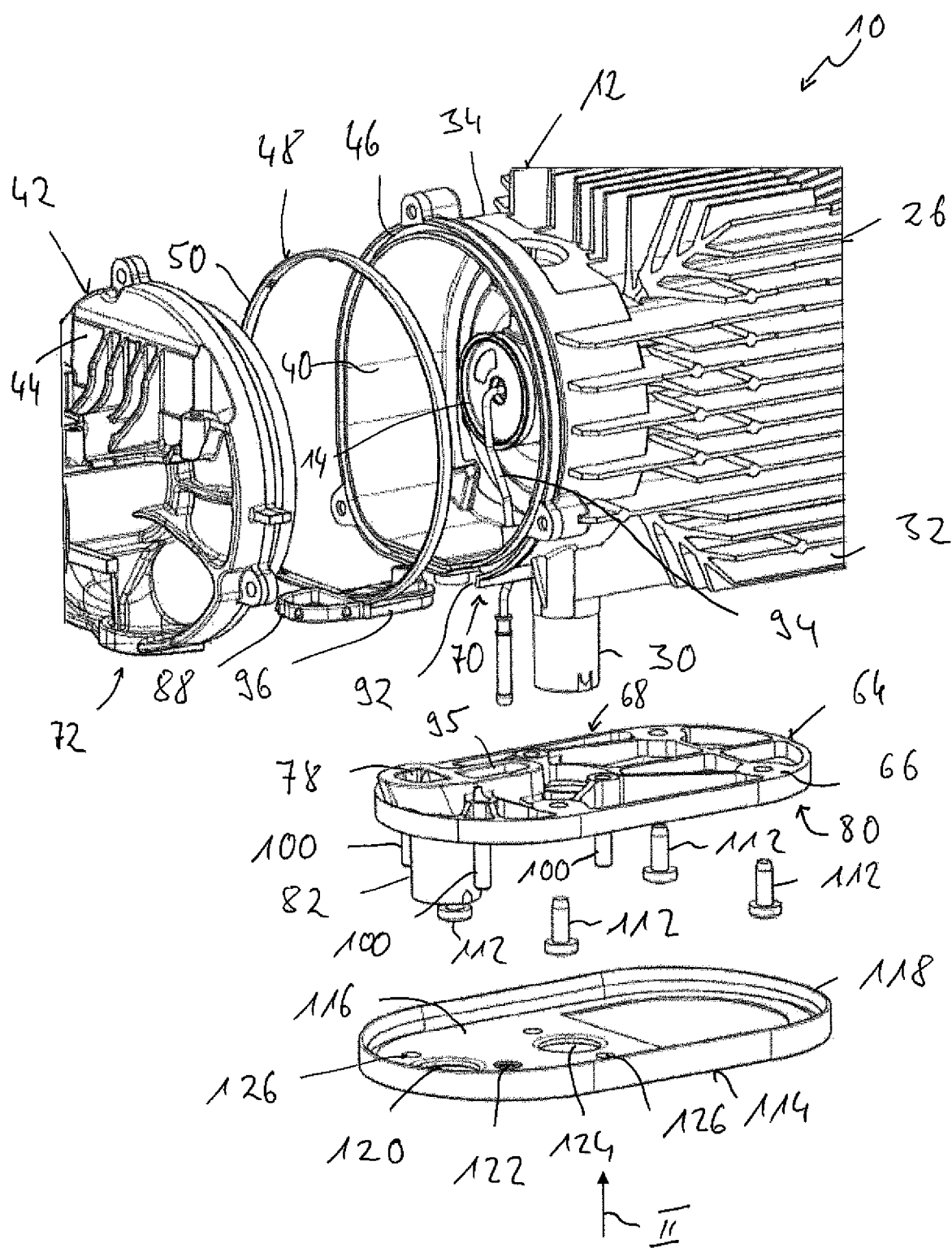
FIG. 1 is a partial exploded view of a vehicle heater.

Referring to the drawings, a fuel-operated vehicle heater is generally designated by 10 in the FIG. 1. The vehicle heater 10 comprises a heater housing 12, which is generally provided as a cast metal part. A combustion chamber assembly unit 14 is carried on the heater housing 12. The combustion chamber assembly unit 14 comprises a circumferential wall 16, which together with a bottom area 18 defines a combustion chamber 20. A flame tube 24, which is made integral with the circumferential wall 16 in the example shown, adjoins the circumferential wall 16 in the area of a flame diaphragm 22. The flame tube 24 extends in an area of the heater housing 12, which area provides a heat exchanger area 26 of the heater housing 12 and defines with this area a waste gas backflow space 28. The waste gas backflow space 28 is open in the outward direction or towards a waste gas routing system for the discharge of waste gas via a waste gas outlet pipe 30 that essentially extends in the radially outward direction in relation to a housing longitudinal axis L. A plurality of heat transfer ribs 32, which essentially extend in the direction of the housing longitudinal axis L and provide a surface around which air to be heated can flow for the transfer of heat to air to be introduced, for example, into a vehicle interior, are further provided in the heat exchanger area 26 of the heater housing 12.

The heater housing 12 has a housing circumferential wall 34 in an area adjoining the heat exchanger area 26. This housing circumferential wall 34 adjoins the heat exchanger area 26 in a step area 36, to which a carrier 38 of the combustion chamber assembly unit 14 is connected, and surrounds a combustion air flow space 40 in the radially outward direction.

A combustion air blower 42, which is configured as a side channel blower, is fixed to the heater housing 12 with a combustion air blower housing 44 that is located opposite a front side 46 of the circumferential wall 34. To achieve a gastight connection, a sealing element, which is generally designated by 48, with a ring-like first sealing element area 50 is arranged between the front side 46 of the housing circumferential wall 34 and a front side 52 of the combustion air blower housing 44, which front side 52 is located opposite this front side 46.

A ring-like feed duct 54 that is axially open towards the front side 52 is formed in the combustion air blower housing 44. A combustion air inlet opening 56 with an opening central axis O, which has an essentially radial orientation, leads into the feed duct 54. A feed wheel 58 overlaps the feed duct 54 on the front side 52 and is carried on a rotor shaft 60 of a blower motor 62 carried on the combustion air blower housing 44, which rotor shaft protrudes on the front side 52, and thus can be driven for rotation by the blower motor 62.

Figure 3:
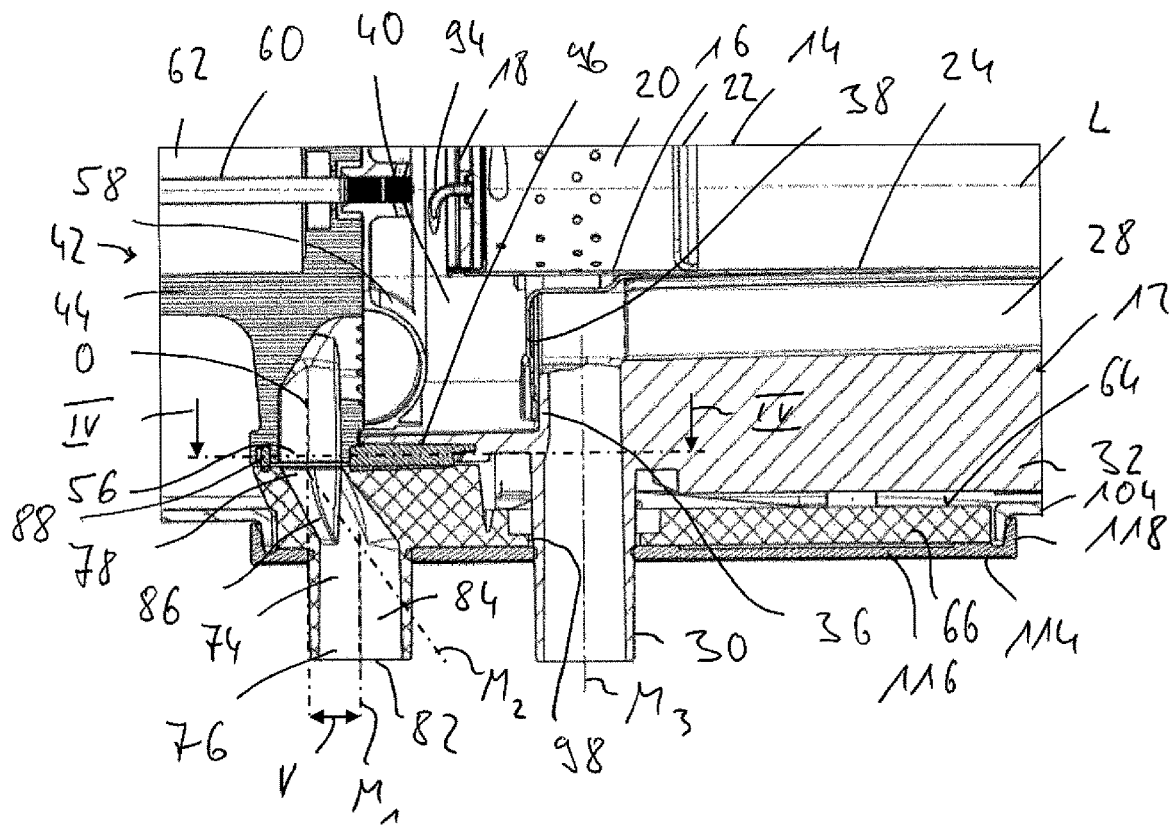
FIG. 3 is a partial longitudinal sectional view of the vehicle heater from FIG. 1, cut along a line III-III in FIG. 2.

The vehicle heater 10 further comprises a combustion air connection unit generally designated by 64. This combustion air connection unit 64, which is made, for example, of plastic material, but is preferably made of aluminum because of its better temperature resistance, comprises a plate-shaped connection unit body 66, which is located with a first body side 68 opposite an outer side 70 of the housing circumferential wall 34 and opposite an outer side 72 of the combustion air blower housing 44. The combustion air connection unit 64 provides a combustion air passage duct 74. This combustion air passage duct 74 is open in the outward direction in a first duct opening area 76 and is open towards the combustion air inlet opening 56 in the combustion air blower housing 44 in a second duct opening area 78. A combustion air inlet pipe 82 protrudes at the plate-shaped connection unit body 66 on a second body side 80, which faces away from the first body side 68. The combustion air inlet pipe 82 provides a first duct section 84 of the combustion air passage duct 74, wherein the first duct section 84 also provides the first duct opening area 76 and is open in the outward direction in the area of same first duct opening area. The first duct section 84 has a duct central axis M1, which is arranged offset to the combustion chamber assembly unit 14 in relation to this combustion air inlet opening 56 in the direction of the housing longitudinal axis L, essentially extends radially, and is parallel, for example, to the opening central axis O of the combustion air inlet opening 56. The opening central axis O, the duct central axis M1 and the housing longitudinal axis L may lie, for example, in a common plane, which is represented by the sectional plane of the view from FIG. 3.

A second duct section 86 of the combustion air passage duct 74 is formed in the connection unit body area 66. The second duct section 86 leads from the first duct section 84 to the second duct opening area 78 and provides same. The second duct section 86 has a duct central axis M2, which is bent at an angle in relation to the duct central axis M1 of the first duct section 84, so that the second duct section 86 is set at an angle in relation to the first duct section 84 and establishes a connection between the first duct section 84 and the combustion air inlet opening 56 in the combustion air blower housing 44, which connection compensates the offset V of the opening central axis O in relation to the duct central axis M1. In this case, the second duct section 86 may have such a cross-sectional structure, which changes over the longitudinal extension thereof, that it has in its end area adjoining the first duct section 84 a cross-sectional geometry corresponding to the cross-sectional geometry of the first duct section 84, which geometry is, for example, circular, and in its end area located opposite the combustion air inlet opening 56 and providing the second duct opening area 76 has a cross-sectional geometry which is adapted to the D-shaped cross-sectional geometry of the combustion air inlet opening 56.

The sealing element 48 has a second sealing element area 88 to achieve a tight connection against the discharge of gas where the combustion air connection unit 64 with the second duct opening area 78 is located opposite the combustion air inlet opening 56 in the combustion air blower housing 44 on the outer side 72 thereof. This second sealing element area 88 also has an essentially ring-like structure, is adapted to the cross-sectional contour of the combustion air inlet opening 56 and may be accommodated in a groove-like recess 90, which is provided enclosing the combustion air inlet opening 56 at the combustion air blower housing 44 such that the second sealing element area 88 is held in its area enclosing the second duct opening area 78 between the outer side 72 of the combustion air blower housing 44 and the connection unit body 66. In this case, the second sealing element area 88 thus extends along an edge area of the combustion air inlet opening 56 and along the second duct opening area 78.

A fuel line passage recess 92, which is axially open towards the front side 46 of the heater housing, is provided in the housing circumferential wall 34 of the heater housing 12. A fuel line 94 leading to the bottom area 18 of the combustion chamber assembly unit 14 extends through the combustion air flow space 40 and through the fuel line passage recess 92 and also passes through a fuel line passage opening 95 in the connection unit body 66 of the combustion air connection unit 64, which fuel line passage opening corresponds to the fuel line passage recess 92 in its contour. The sealing element 48 has a third sealing element area 96 to achieve a tight connection of the connection unit body 66 against the discharge of gas in this area on the outer side 70 of the housing circumferential wall 34 as well. This third sealing element area extends from the ring-like first sealing element area 50 essentially in the circumferential area, in which the second sealing element area 88 also adjoins this circumferential area, and in a direction away from the first sealing element area 50, which direction is located opposite the direction of extension of the second sealing element area 88 and has, for example, a likewise ring-like structure.

Figure 2:
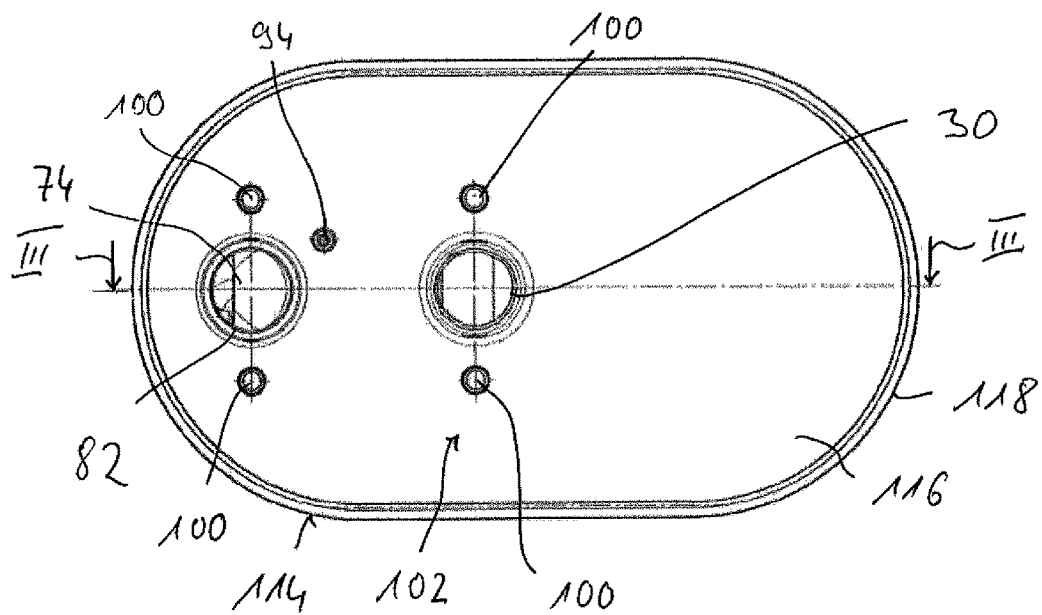
FIG. 2 is a view of a connection unit sealing element of the vehicle heater from FIG. 1 in viewing direction II in FIG. 1.

Further, a passage opening 98 is provided for the waste gas outlet pipe 30 in the connection unit body 66 of the combustion air connection unit 64. The waste gas outlet pipe 30 is, as clearly shown in FIG. 2, positioned here such that a duct central axis M3 of same lies in the plane containing the duct central axis M1 of the first duct section 84 of the combustion air passage duct 74 and the housing longitudinal axis L.

Mounting pins 100 of a mounting formation generally designated by 102, which are configured, for example, as studs or set screws, and protrude on the second body side 80 at the connection unit body 66 of the combustion connection unit 64, are provided, for example, each at an angle to the housing longitudinal axis L on both sides of the waste gas outlet pipe 30 and of the combustion air inlet pipe 82. These mounting pins 100, which are configured, for example, with an outer thread, can thus be inserted into corresponding openings of a connection area provided in a vehicle, so that fixed mounting of the vehicle heater 10 in a vehicle by means of screw connection is made possible.

The positioning of the four mounting pins 100 as well as the positioning of the combustion air inlet pipe 82 protruding at the connection unit body 66 on the second body side 80 and the positioning of the waste gas outlet pipe 30 provided at the heater housing 12 correspond in this case to a connection pattern predefined by the connection area. The positioning of the fuel line 94 in its area passing through the connection unit body 66 in the area of the fuel line passage opening 95 also corresponds to the connection pattern predefined by the connection area in a vehicle. The fixed and stable connection of the vehicle heater 10 to a connection area of a vehicle, which connection area provides a defined connection pattern, is thus guaranteed in a simple manner, on the one hand, and it is guaranteed, on the other hand, that all lines and ducts provided for guiding media can be integrated into this vehicle-fixed connection area in a correspondingly defined manner, in order to be able to guide combustion air and fuel to the vehicle heater, on the one hand, and to be able to discharge the waste gas generated during combustion from the vehicle heater 10, on the other hand.

Figure 4:
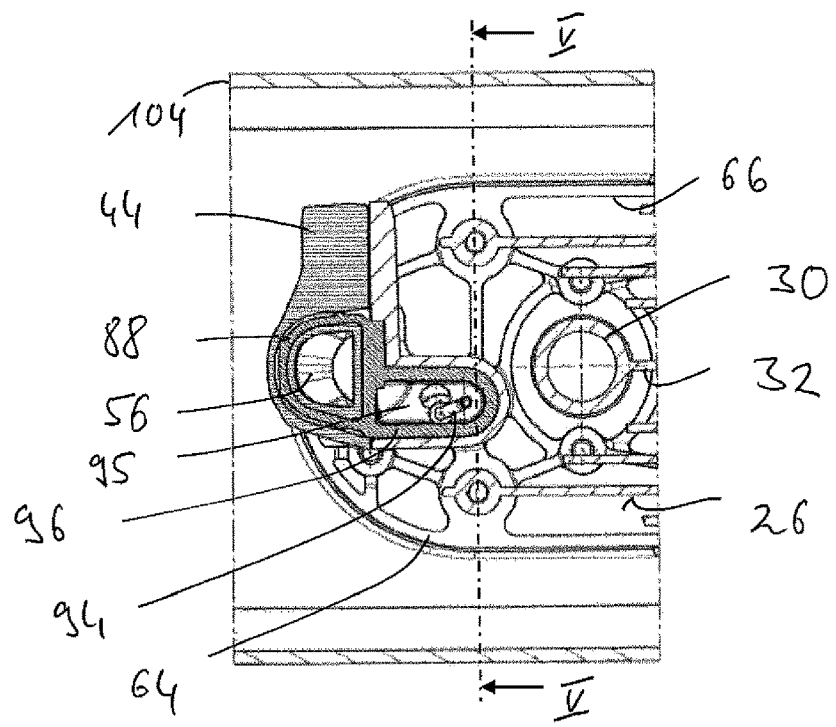
FIG. 4 is another partial longitudinal sectional view of the vehicle heater from FIG. 1, cut along a line IV-IV in FIG. 3.
Figure 5:
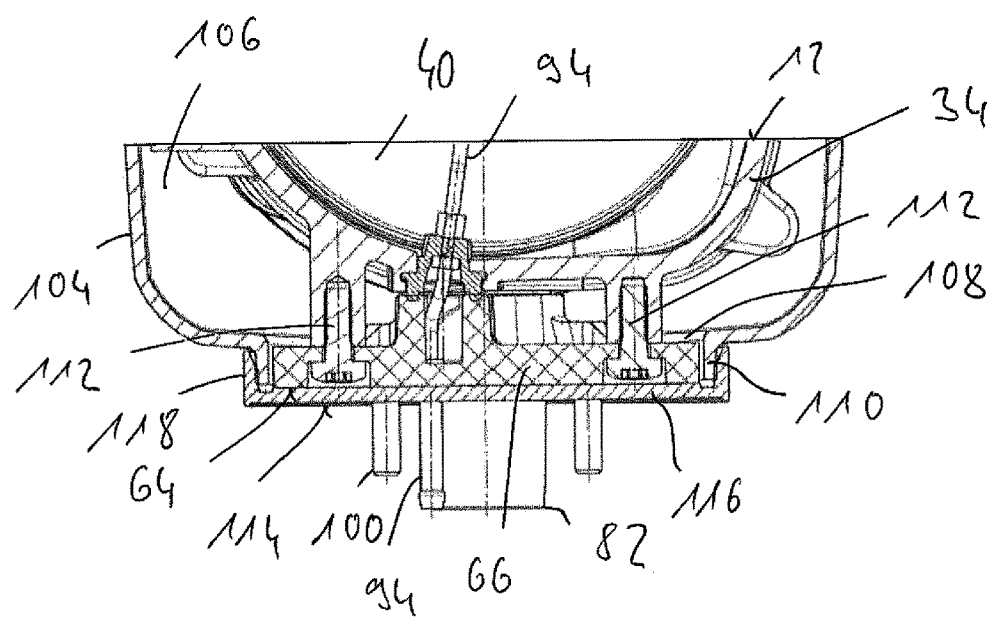
FIG. 5 is a partial cross-sectional view of the vehicle heater from FIG. 1, cut along a line V-V in FIG. 4.
Figure 6:
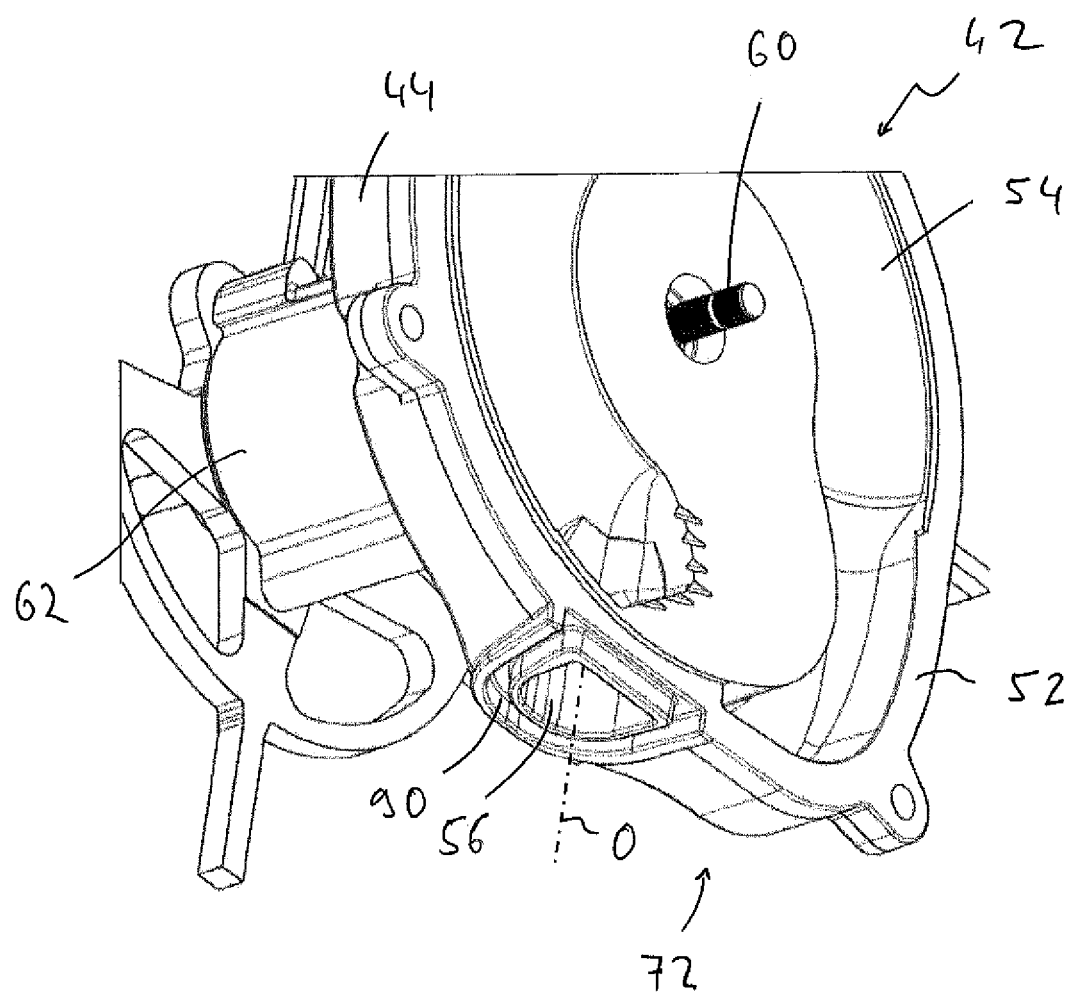
FIG. 6 is a perspective partial view of a combustion air blower of the vehicle heater from FIG. 1.

FIGS. 4 and 5 clearly show that the heater housing 12 is accommodated in an outer housing 104, which is made, for example, of plastic material, so that a flow space 106 for the air to be heated in the heat exchanger area 26 is formed between the outer side of the heater housing, especially of the heat exchanger area 26 of same, and the outer housing 104. This air may be fed by means of a heating air feed wheel, which is coupled with the rotor shaft 60 of the blower motor 62, through the flow space 106 and thus along the heat transfer ribs 32 in the heat exchanger area 26.

A connection unit opening 108, which is enclosed by an edge area 110 and in which the combustion air connection unit 64 is accommodated, is formed in the outer housing 104. The fixed connection of the combustion air connection unit 64 to the heater housing 12 may be established by a plurality of bolts 112 passing through the combustion air connection unit 64. A connection unit sealing element 114 is in contact with a plate-shaped body area 116 on the second body side 80 of the connection unit body 66 and with an edge area 118 protruding from the body area 116 overlaps the edge area 110 of the outer housing 104 and thus provides a gastight connection in this area.

A passage opening 120, 122, 124 or 126 each is provided in the body area 116 of the connection unit sealing element 114 in association with the combustion air inlet pipe 82, with the fuel line 94, with the waste gas outlet pipe 30 and with each mounting pin 100. These openings 120, 122, 124, 126 are dimensioned such that the connection unit sealing element, which is made of elastic material, with its area enclosing each one of these openings under pretension, is in contact with a corresponding outer circumferential surface of the combustion air inlet pipe 82, of the waste gas outlet pipe 30, of the fuel line 94 as well as of the mounting pins 100 and also generates a gastight connection in this area.

Thus, it becomes possible with the above-described configuration of a vehicle heater, in which the combustion air inlet pipe is structurally uncoupled from the combustion air blower, to position the combustion air inlet pipe such that it especially also has a relative positioning predefined by a vehicle-fixed connection area in relation to the waste gas outlet pipe regardless, for example, of the dimensioning or configuration of the combustion air blower and also of the heater housing. This especially makes it possible to use combustion air blowers having an axially larger structure, for heaters with greater heat output, in which the combustion air blower housing also moves axially further away from the combustion chamber assembly unit because of the larger size of the feed wheel of the combustion air blower.

While specific embodiments of the invention have been shown and described in detail to illustrate the application of the principles of the invention, it will be understood that the invention may be embodied otherwise without departing from such principles.

What is claimed is:

1. A vehicle heater, comprising:
   a heater housing, which is elongated in a direction of a housing longitudinal axis, the housing comprising a housing circumferential wall defining a combustion air flow space in a radially outward direction;
   a combustion chamber assembly unit carried on the heater housing, with a combustion chamber receiving combustion air from the combustion air flow space;
   a combustion air blower comprising a combustion air blower housing carried on the heater housing, wherein a combustion air inlet opening is provided in the combustion air blower housing for an intake of combustion air into the combustion air blower;
   a combustion air connection unit carried on the heater housing and comprising a plate-shaped connection unit body, wherein the connection unit body is positioned with a first body side located opposite an outer side of the housing circumferential wall and an outer side of the combustion air blower housing, a combustion air passage duct of the combustion air connection unit being provided at the connection unit body, the combustion air passage duct being open in an outward direction in a first duct opening area for receiving combustion air and being open towards the combustion air inlet opening in a second duct opening area; and
   a single sealing element, which gastight seals the combustion air blower housing in relation to the heater housing, gastight seals the combustion air blower housing in relation to the combustion air connection unit and gastight seals the heater housing in relation to the combustion air connection unit.

2. A vehicle heater in accordance with claim 1, wherein:
   the combustion air inlet opening has an opening central axis that has an essentially radial orientation;
   a first duct section of the combustion air passage duct, which defines the first duct opening area, has a duct central axis that has an essentially radial orientation; and
   the duct central axis is offset in the direction of the housing longitudinal axis in relation to the opening central axis.

3. A vehicle heater in accordance with claim 1, wherein:
   the combustion air passage duct is open with a combustion air passage duct second duct opening area towards the combustion air inlet opening on the first body side of the connection unit body; and
   a combustion air inlet pipe, which at least partially defines the first duct section, protrudes on a second body side of the connection unit body, which second body side faces away from the first body side.

4. A vehicle heater in accordance with claim 1, wherein:
   a second duct section, which leads from the first duct section to the second duct opening area and which defines the second duct opening area, is provided in the connection unit body; and
   the second duct section has a duct central axis that is bent at an angle to the duct central axis of the first duct section.

5. A vehicle heater in accordance with claim 1, wherein:
   the sealing element is positioned with a first sealing element area between a front side of the housing circumferential wall and a front side of the combustion air blower housing, which front side of the combustion air blower housing is located opposite the front side of the housing circumferential wall;
   the sealing element is positioned with a second sealing element area extending along an edge area of the combustion air inlet opening between the combustion air blower housing and the combustion air connection unit; and
   the sealing element is positioned with a third sealing element area meshing with a fuel line passage recess, which is formed in the housing circumferential wall, is open in the direction of the front side of the housing circumferential wall, and through which a fuel line passes.

6. A vehicle heater in accordance with claim 5, wherein the sealing element is positioned with its third sealing element area between the housing circumferential wall and the combustion air connection unit extending along an edge area of the fuel line passage recess and the fuel line passage opening.

7. A vehicle heater in accordance with claim 1, wherein the combustion air connection unit has a fuel line passage opening.

8. A vehicle heater in accordance with claim 1, wherein the combustion air connection unit has a waste gas outlet passage opening, and a waste gas outlet pipe provided on the heater housing extends through the waste gas outlet passage opening.

9. A vehicle heater in accordance with claim 1, wherein a mounting formation is provided at the combustion air connection unit for the fixed mounting of the vehicle heater on a heater carrier.

10. A vehicle heater in accordance with claim 9, wherein the mounting formation comprises a plurality of mounting pins.

11. A vehicle heater in accordance with claim 1, wherein:
   the heater housing is accommodated in an outer housing; and
   a connection unit opening, which accommodates the combustion air connection unit, is provided in the outer housing.

12. A vehicle heater in accordance with claim 11, further comprising a connection unit sealing element, which gastight seals the combustion air connection unit in relation to the outer housing.

13. A vehicle heater in accordance with claim 12, wherein:
   the combustion air connection unit has a fuel line passage opening;
   the combustion air connection unit has a waste gas outlet passage opening, and a waste gas outlet pipe provided on the heater housing extends through the waste gas outlet passage opening;
   the combustion air passage duct is open with a combustion air passage duct second duct opening area towards the combustion air inlet opening on the first body side of the connection unit body;
   a combustion air inlet pipe, which at least partially defines the first duct section, protrudes on a second body side of the connection unit body, which second body side faces away from the first body side;
   a mounting formation is provided at the combustion air connection unit for the fixed mounting of the vehicle heater on a heater carrier and the mounting formation comprises a plurality of mounting pins; and
   the connection unit sealing element has a plurality of passage openings and provides a gastight sealing in relation to the combustion air inlet pipe, the fuel line, the waste gas outlet pipe and the mounting pins, each of which sealingly passes through the connection unit sealing element.

* * * * *